United States Patent
Dabak

(10) Patent No.: US 6,272,166 B1
(45) Date of Patent: Aug. 7, 2001

(54) REDUCED GAIN SPREAD SPECTRUM COMMUNICATION SYSTEM AND METHOD

(75) Inventor: Anand G. Dabak, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/938,171

(22) Filed: Sep. 26, 1997

Related U.S. Application Data
(60) Provisional application No. 60/027,275, filed on Sep. 27, 1966.

(51) Int. Cl.[7] .................................................. H04B 15/00
(52) U.S. Cl. ......................... 375/130; 375/140; 375/146; 370/335; 370/342
(58) Field of Search .................................... 375/200, 206, 375/208; 370/335, 342, 479

(56) References Cited

U.S. PATENT DOCUMENTS

| | | | |
|---|---|---|---|
| 4,930,140 | * | 5/1990 | Cripps et al. ............................ 375/1 |
| 5,442,662 | * | 8/1995 | Fukasawa et al. ..................... 375/205 |
| 5,537,397 | | 7/1996 | Abramson ................................ 370/18 |
| 5,661,750 | * | 8/1997 | Fulton .................................... 375/208 |
| 5,745,485 | * | 4/1998 | Abramson ............................. 370/342 |
| 5,790,588 | * | 8/1998 | Fukawa et al. ........................ 375/200 |
| 5,790,591 | * | 8/1998 | Gold et al. ............................. 375/207 |
| 5,841,768 | * | 11/1998 | Ozluturk et al. ...................... 370/335 |
| 5,862,171 | * | 1/1999 | Manany ................................. 375/200 |
| 5,946,344 | * | 8/1998 | Warren et al. ........................ 375/207 |

* cited by examiner

*Primary Examiner*—Stephen Chin
*Assistant Examiner*—Dac V. Ha
(74) *Attorney, Agent, or Firm*—Ronald O. Neerings; Wade James Brady, III; Frederick J. Telecky, Jr.

(57) ABSTRACT

A reduced gain spread spectrum communication system (6) includes transceivers (8) coupled to a base station (10). Each transceiver (8) includes a spreader (28) that spreads a digital packet (26) representing voice using a spreading sequence length smaller than the available spreading gain for a given transmission bandwidth. The spreader (28) can also spread a digital packet (26) representing data using a spreading sequence length greater than the spreading sequence length for voice.

24 Claims, 3 Drawing Sheets

REDUCED GAIN SPREAD SPECTRUM COMMUNICATION SYSTEM AND METHOD

This application claims benefit of provisional application Ser. No. 60/027,275 filed Sep. 27, 1996.

TECHNICAL FIELD OF THE INVENTION

This invention relates to the field of multi-user communication systems, and more particularly to a reduced gain spread spectrum communication system and method.

BACKGROUND OF THE INVENTION

The popularity of wireless communication systems, such as cellular telephones, has lead to the need for different techniques to allow multiple users to communicate simultaneously. Some existing wireless communication systems support different users transmitting both voice and data.

A code division multiple access (CDMA) system assigns specific codes to users, thus allowing a base station to separate out individual communications based on the code. A time division multiple access (TDMA) system assigns specific time slots for communication to ensure that user communications do not interfere with each other. These systems suffer from several drawbacks including the complexity required for both the transmitting device and the base station, the inability for all users to transmit at once, and a reduced system capacity based on the number of available codes or time slots.

Some systems that attempt to solve some of these drawbacks use the Aloha protocol. One version of the Aloha system allows multiple users to transmit simultaneously but there is no spreading of the signal. This system suffers from reduced capacity for an available transmission bandwidth. Another version of the Aloha system spreads the signal throughout the available transmission bandwidth. This systems offers increased capacity but may not be suitable for real-time communication, such as voice, that depends on a guaranteed transmission rate.

SUMMARY OF THE INVENTION

In accordance with the present invention, a reduced gain spread spectrum communication system and method are provided which substantially eliminate or reduce disadvantages and problems associated with prior multi-user wireless communication systems.

In accordance with one embodiment of the present invention, an apparatus for wireless communication includes a spreader having an input and an output. The spreader receives a digitized voice signal and spreads the digitized voice signal using a voice spreading sequence length less than an available spreading gain to generate a voice spread signal. A transmitter transmits the voice spread signal. The spreader can also receive a data signal and spread the data signal using a data spreading sequence length greater than the voice spreading sequence length to generate a data spread signal.

Technical advantages of the present invention include a multi-user wireless communication system that allows more than one user to transmit the same code, thus reducing system complexity. Additionally, since this is an asynchronous system, the present invention allows users to transmit simultaneously. Also, by choosing a voice spreading sequence length less than the total available spreading gain, the transmission time decreases sufficiently to allow for retransmission in the event packets from different users interfere or collide with each other. Therefore, the present invention allows for the real-time transmission of voice in a multi-user environment.

BRIEF DESCRIPTION OF THE DRAWINGS

For a more complete understanding of the present invention and its advantages, reference is now made to the following descriptions taken in conjunction with the accompanying drawings, in which.

DETAILED DESCRIPTION OF THE INVENTION

Figure 1:
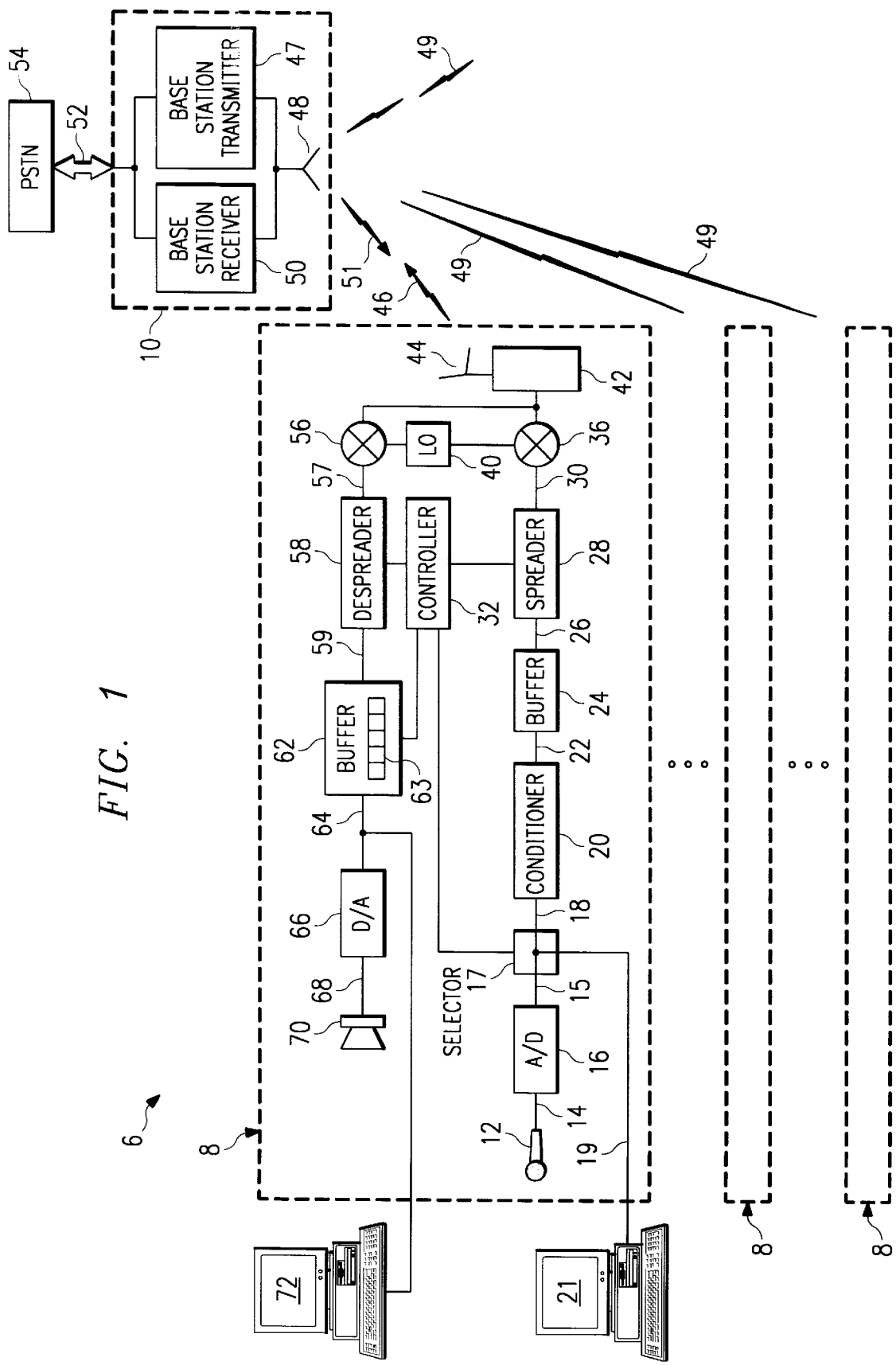
FIG. 1 provides a block diagram of a reduced gain spread spectrum system.

FIG. 1 illustrates a reduced gain spread spectrum communication system 6 that includes a number of transceivers 8 coupled to a base station 10. The blocks in FIG. 1 represent functional blocks only and not any particular component. Of course, an actual system could combine some or all of these functional blocks into one or more components or change the order for component design without changing the functionality of the present invention.

Transceiver 8 includes a microphone 12 coupled to an analog-to-digital (A/D) converter 16, which is in turn coupled to a conditioner 20. A selector 17 is coupled between the output of A/D converter 16 and the input of conditioner 20. The output of computer 21 is coupled to selector 17. The conditioner 20 is coupled to a buffer 24, which in turn is coupled to a spreader 28. Spreader 28 is coupled in turn to a controller 32 and a transmit mixer 36, which is coupled to a local oscillator 40, a transceiver circuitry 42 and an antenna 44. Controller 32 is also connected to selector 17.

A transmitted signal 46 generated by transceiver circuitry 42 is transmitted by antenna 44 and is received at a base station 10 by a base station antenna 48, which is coupled to a base station receiver 50. Transceiver circuitry 42 includes any suitable transmit or receive circuitry for transmitting and receiving spread signal 30 via antenna 44. In the illustrated embodiment, trunk lines 52 from a public switched telephone network (PSTN) 54 are coupled to base station receiver 50. Alternatively, transmitted signal 46 can be retransmitted by base station transmitter 47 to another transceiver 8.

A received signal 51 from base station 10 is received by transceiver circuitry 42 via antenna 44 and is coupled to a receive mixer 56, which in turn is coupled to local oscillator 40 and a despreader 58.

Despreader 58 is coupled to a buffer 62, which in turn is coupled to a digital-to-analog (D/A) converter 66 for driving a speaker 70. Buffer 62 and despreader 58 are also connected to controller 32. Alternatively, a computer 72 can be coupled to buffer 62 to receive digital data.

In operation, for transmitting, microphone 12 generates a continuous analog signal 14 in response to voice, and passes analog signal 14 to A/D converter 16. A/D converter 16 generates a digitized voice signal 15 from analog signal 14 for presentation to conditioner 20. Alternatively, computer 21 can send data signal 19 to selector 17. The selector 17 determines if the input is digitized voice signal 15 or data signal 19 and communicates this to the controller 32. The controller 32 then signals the spreader 28 as to the proper spreading length. Alternatively, the data signal 19 can be directly presented to the spreader 28 which will spread the digital data using an appropriate spreading length. The selector 17 then passes a digital signal 18 representative of either digitized voice signal 15 or data signal 19, to the conditioner 20. Conditioner 20 takes a sample of digital signal 18 over a buffering interval, T, adding synchronization and identification bits, channel coding, or other control information to generate a digital packet 22. Conditioner 20 can perform additional functions, such as adding frame information. Buffer 24 receives digital packet 22 for storage and presentation to spreader 28. In one embodiment, spreader 28 extracts digital packet 26 from buffer 24 at appropriate time intervals. Alternatively, spreader 28 could directly receive digital packet 22 without being stored in buffer 24. Buffer 24 could be placed after spreader 28 or system 6 could utilize multiple buffers 24, depending on the memory requirements of buffers 24, the processing capacity of spreader 28, or other considerations. For example, buffer 24 placed after spreader 28 reduces processing in spreader 28 in the event of retransmission but may require increased capacity in buffer 24.

Figure 2:
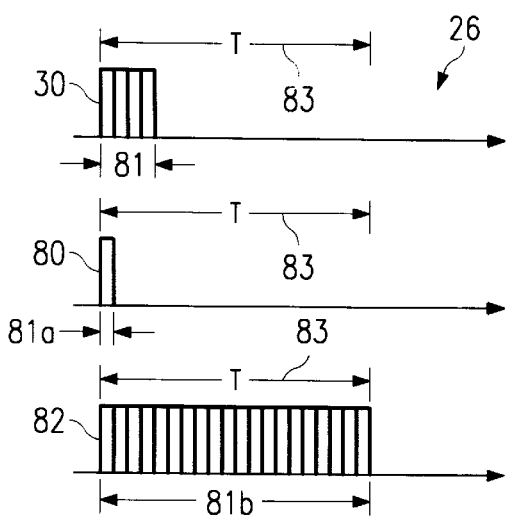
FIG. 2 illustrates the digital signal used by the system in FIG. 1.

Spreader 28 expands the signal bandwidth beyond the original information bandwidth of digital packet 26. If digital packet 22 represents digitized voice signal 15, spreader 28 spreads the signal using a spreading sequence length less than the maximum available spreading gain for a given transmission bandwidth. This is the voice spreading length and spreading in this manner provides a voice spread signal with a transmission time small enough to allow for retransmission in case of a collision or other unsuccessful transmission. On the other hand, if digital packet 22 represents data signal 19, a greater spreading length, the data spreading length is chosen. This produces a data spread signal. In one embodiment the data spreading length is the same as the maximum available gain. The discussion accompanying FIG. 2 provides further details on spreading digital packet 26.

Controller 32 communicates with spreader 28 and supplies spreader 28 with the spreading sequence. The sequence can be a pseudorandom (PN) code, Gold code, Walsh code, other random code, or any other suitable digital sequence. In the present invention, each user in a given area (or cell) uses the same sequence. Spreader 28 sends a spread signal 30 to transmit mixer 36 for modulating at the carrier frequency by local oscillator 40 and transmission by transceiver circuitry 42 via antenna 44. Spread signal 30 is transmitted at the same chip rate whether spread signal 30 represents a voice spread signal or a data spread signal.

Base station 10 receives transmitted signal 46, together with transmitted signals 49 from other transceivers 8, at base station antenna 48. Each transceiver 8 transmits asynchronously. Base station receiver 50 relays transmitted signals 46 received from base station antenna 48 to trunk lines 52 of PSTN 54 or to base station transmitter 47 for transmission to other transceivers 8 in system 6. If base station receiver 50 recognizes an unsuccessful transmission, such as when signals from two or more transceivers 8 collide due to the asynchronous nature of the transmissions, base station 10 notifies transceivers 8. Controller 32 causes spreader 28 to wait a random or different amount of time before retransmitting spread signal 30. This ensures that retransmissions occur at different times to prevent another collision.

When receiving transmissions from base station 10, transceiver circuitry 42 of transceiver 8 receives received signal 51 via antenna 44 and passes received signal 51 to receive mixer 56 coupled to local oscillator 40 to generate a spread signal 57. Despreader 58 receives spread signal 57 and generates a digital packet 59 for storage in buffer 62. Despreader 58 despreads spread signal 57 using the spreading sequence supplied by controller 32 and used by spreader 28 to spread the signal for transmission. Buffer 62 includes circuitry 63 to rearrange digital packet 59, if necessary. Buffer 62 and circuitry 63 rearrange, concatenate and/or strip digital packet 59 to produce a digital signal 64 for presentation to D/A converter 66. In one embodiment, circuitry 63 in buffer 62 may remove synchronization and identification bits, channel coding, or other control information for delivery to controller 32. D/A converter 66 converts digital signal 64 into an analog signal 68 for driving speaker 70. Alternatively, buffer 62 passes digital signal 64 directly to computer 72 or other device capable of interpreting digital signals.

FIG. 2 illustrates in more detail spread signal 30 used in system 6. In a particular embodiment, digital signal 18 represents a voice transmission digitized by A/D converter 16. If R is the rate (in bits per second) of digital signal 18 and conditioner 20 takes a sample of length T (in seconds, also known as the buffering interval), each digital packet 26 contains RT bits, with digital packet 26 generated every T seconds. The available spreading gain (G) which is a numerical representation of the maximum length of a spreading sequence for a given available transmission bandwidth (W) is:

$$G = \frac{W}{R}$$

For voice applications, a voice spreading sequence delivered to spreader 28 from controller 32 of any length from one (representing no spreading) to G (maximum spreading) can be chosen. The time it takes to transmit an individual packet ($\tau$) is related to the available spreading gain (G) and the chosen spreading sequence length (g) as follows:

$$\tau = \frac{gT}{G}$$

Thus, if the length of the spreading sequence (g) is smaller than the spreading gain available (G) the transmission time ($\tau$) will be smaller than the original buffering interval (T). The smaller the transmission time ($\tau$) the more time available to retransmit an unsuccessful transmission. This is important in real-time voice communication where any lost digital packet 26 due to collision or other failed transmission may seriously degrade voice fidelity.

As a simple illustration of spreading, consider a digital packet 26 of six bits with the sequence "110101." Then assume that controller 32 sends spreader 28 a seven bit spreading sequence "11110010" (g=7). Using the spreading sequence to spread digital packet 26, spreader 28 produces a forty-two chip spread signal 30 with a sequence of "1110010 1110010 0001101 1110010 0001101 1110010" where each "1" in digital packet 26 becomes "1110010" and each "0" in digital packet 26 becomes "0001101."

In a traditional code division multiple access (CDMA) system, each transceiver 8 is associated with a different spreading sequence and a remote station can distinguish between multiple transmissions based on the different sequences used. However, this adds complexity to the system since base station 10 and transceiver 8 would have to be able to handle multiple codes. If the spreading sequence (g) is of length one (g=1), there is no spreading. While this leaves time available for retransmission the number of transceivers 8 operating on the same frequency is limited. This is the traditional Aloha approach. If the spreading sequence (g) is the same as the maximum spreading gain (G=g), maximum spreading occurs. In this case, the transmission time (τ) is the same as the buffering interval (T) and there is no time available for retransmission. This is the full spread Aloha approach.

A particular advantage of the present invention results in the choice of a voice spreading sequence length between no spreading and maximum spreading that both supports multi-user operation and allows for retransmission after collision. The spreading sequence length (g) is chosen to be less than the available spreading gain (G). A proper choice of spreading sequence length (g) allows for both enough time for retransmission and the ability to support multiple users.

In an exemplary system, considering a transmission bandwidth (W) of ten MHZ and a rate of voice transmission (R) for speech of twenty Kbps, the available spreading gain (G) is:

$$G = \frac{W}{R} = \frac{10 \times 10^6}{20 \times 10^3} = 500$$

Assuming a typical buffering interval(T=10 msec) and an appropriate voice spreading sequence (g=100) the transmission time (τ) is:

$$\tau = \frac{gT}{G} = \frac{100(10\,\text{msec})}{500} = 2\,\text{msec}$$

Thus, the transmission time (τ) is significantly less than the buffering interval (T). This represents a significant advantage over the full spread Aloha in that the time savings will allow for real-time voice transmissions, even in an environment that produces collisions or other failed transmission.

Referring back to FIG. 2, spread signal 30 representing a voice spread signal in system 6 occupies a transmission time 81 that is less than a buffering interval 83 of the original digital packet 26. In this specific example, transmission time 81 is one-fifth of buffering interval 83 and a packet could be retransmitted before T seconds expire. A non-spread voice signal 80 (g=1) occupies transmission time 81a that is much less than buffering interval 83. This allows for retransmissions. However, since there is no spreading at all, user communications may interfere. A fully spread voice signal 82 has a transmission time 81b that is the same as buffering interval 83. In other words, the voice spreading sequence length is the same as the available spreading gain. While this allows for increased frequency reuse in adjacent cells, there is no time available for retransmission.

Figure 3:
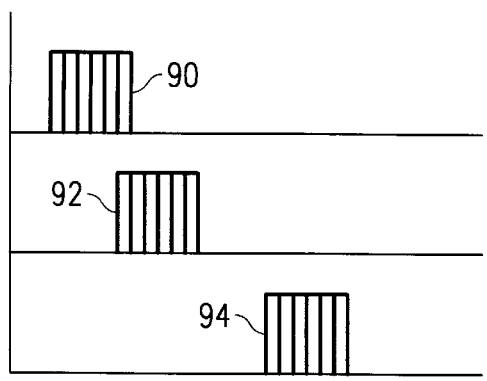
FIG. 3 illustrates non-colliding digital signals of users.

FIG. 3 illustrates the non-collision of spread signal 30 representing a voice spread signal. System 6 supports asynchronous transmissions from transceivers 8; therefore, the possibility exists that spread signal 30 from two or more transceivers 8 will interfere with each other or collide, resulting in an unsuccessful transmission. A collision occurs when the starting time of spread signal 30 from one transceiver 8 is within a one chip interval of the start of each bit with another spread signal 30 from another transceiver 8.

Thus, while spread signal 90 and spread signal 92 overlap they are not within the initial one chip interval so these spread signals do not collide. Spread signal 90 and 92 do not collide with spread signal 94 since there is no overlap.

Figure 4:
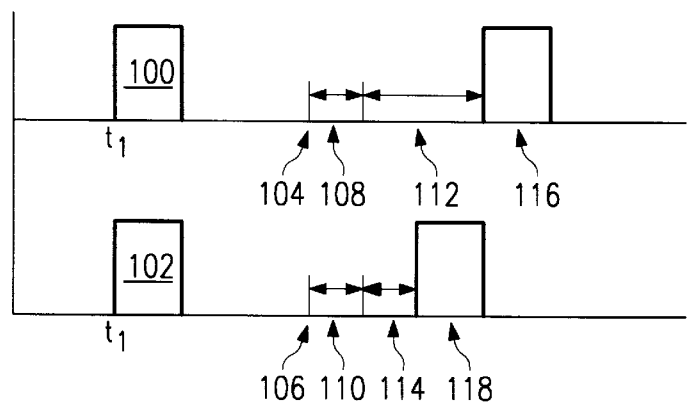
FIG. 4 illustrates the collision and retransmission of digital signals.

FIG. 4 illustrates the collision and retransmission of spread signal 30 where spread signal 30 represents a voice spread signal. Base station 10 receives a packet 100 and a packet 102 within a one chip interval and detects a collision. Each transceiver 8 receives notification of collision at time 104 and 106 from base station 10. After a setup time 108 and 110 and a different or random wait time 112 and 114, each transceiver 8 retransmits packets 116 and 118, respectively. The different or random wait times 112 and 114 ensure that there will not be a collision between these two users upon retransmission.

Figure 5:
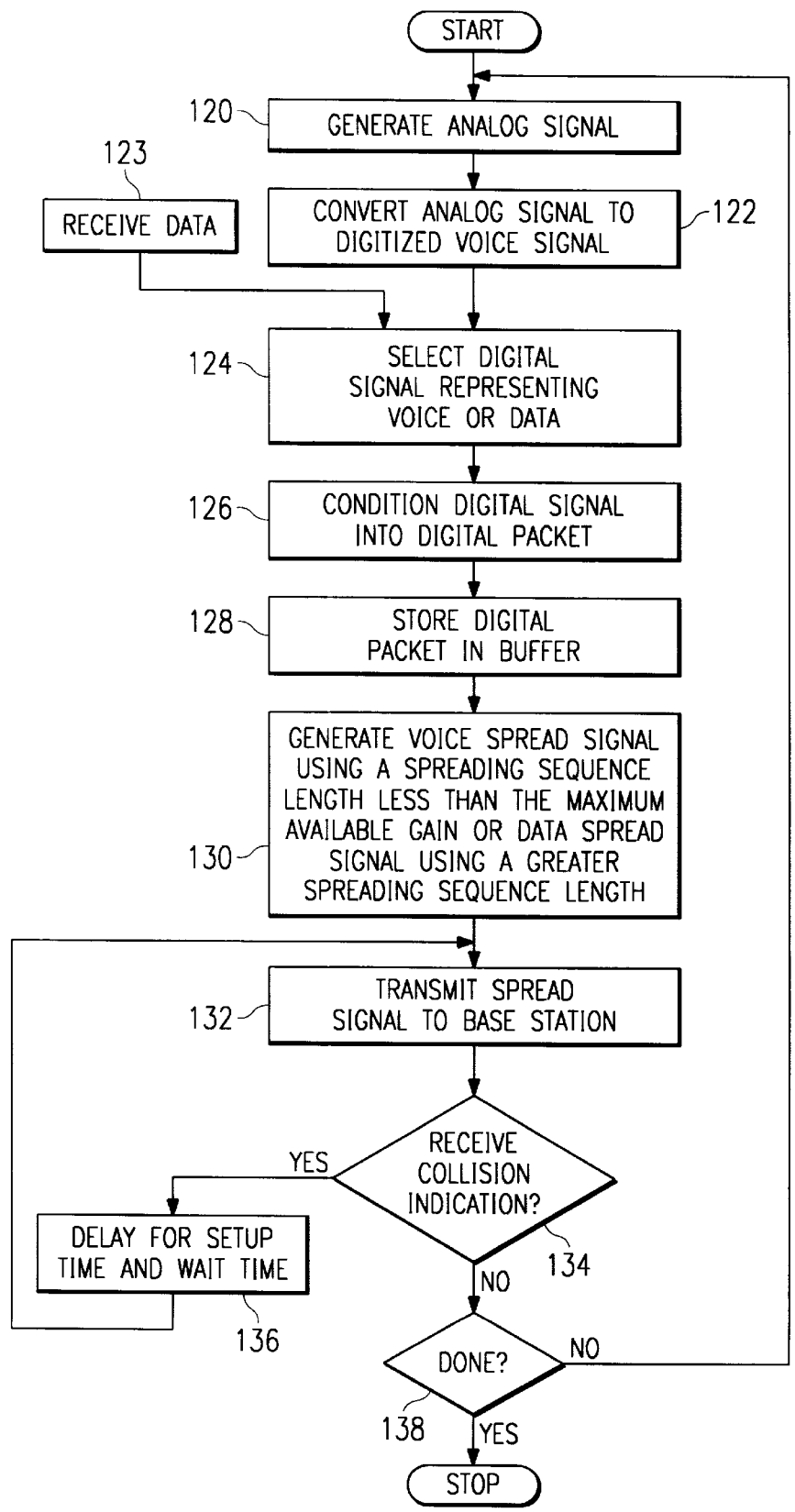
FIG. 5 is a flow chart of a method of operation of a transmitter.

FIG. 5 provides a flow chart of a method of operation of system 6. Initially, microphone 12 generates an analog signal 14 at step 120. A/D converter 16 converts analog signal 14 into digitized voice signal 15 at step 122. Selector 17 determines if it received digitized voice signal 15 or data signal 19 generated by computer 21 at step 123, relays this information to controller 32 and passes on digital signal 18 at step 124. At step 126, conditioner 20 selects a sample of digital signal 18 over buffering interval (T), and adds synchronization and identification bits, channel coding, or other control information to generate digital packet 22. Buffer 24 receives and stores digital packet 22 for use by the spreader 28 at step 128.

Spreader 28 generates spread signal 30 at step 130 using a spreading sequence supplied by controller 32. The spreading sequence depends on the type of signal presented to the selector 17. Digital packet 22 representing digitized voice signal 15 are spread using a voice spreading length less than the available spreading gain. Digital packet 22 representing data signal 19 is spread using a data spreading sequence greater than the voice spread sequence. In one embodiment the data spreading sequence length is equal to the maximum spreading gain with a length less than the available spreading gain. Transceiver circuitry 42 receives spread signal 30 and transmits spread signal 30 via antenna 44 to base station 10 at step 132. If a collision occurs and transceiver 8 receives an acknowledgment of an unsuccessful transmission at step 134, transceiver 8 delays for a setup time and wait time at step 136 before retransmitting at step 132. By waiting a different or random time further collisions are avoided.

If transceiver 8 does not receive a collision indication at step 134, transceiver 8 determines if all digital packets 26 have been transmitted at step 138. If not, the method proceeds at step 120. If all digital packets 26 have been transmitted, the process ends.

Figure 6:
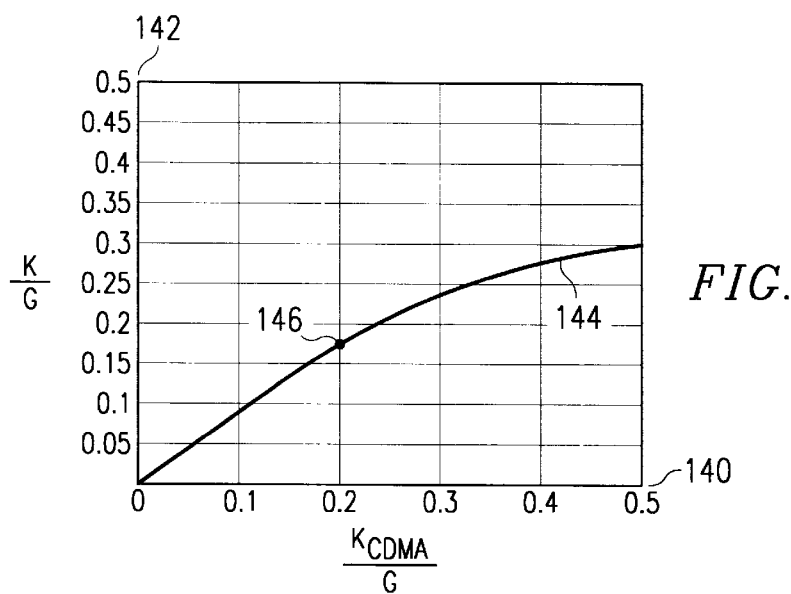
FIG. 6 illustrates the efficiency of the reduced gain spread spectrum system.

FIG. 6 illustrates the efficiency of the spreading and transmission techniques of system 6 for voice communication compared to a traditional code division multiple access (CDMA) system. Horizontal axis 140 indicates the ratio of users to available spreading gain for a CDMA system. This is also known as the throughput of the CDMA system. Vertical axis 142 indicates the ratio of users to available spreading gain, or throughput, for system 6. Curve 144 relates the throughput of a CDMA system to the throughput of system 6. For example, a typical CDMA system may have a throughput of 0.20, which corresponds to a throughput of approximately 0.17 in system 6, as indicated by point 146 on curve 144. Assuming an available spreading gain (G) of 500, the CDMA system would support 100 (0.2×500) users, while system 6 would support 85 users (0.17×500). Thus, there is a small drop off in capacity for using system 6. However, system 6 makes up for that in its lack of complexity.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. An apparatus for wireless communication, the apparatus comprising:
   a spreader, having an input and an output, the spreader operable to receive a digitized voice signal at the input and to spread the digitized voice signal using a voice spreading sequence length less than an available spreading gain for a given transmission bandwidth to generate a voice spread signal, said spreader further operable to receive a data signal at the input and to spread the data signal using a data spreading sequence length greater than the voice spreading sequence length to generate a data spread signal; and
   a transmitter operable to transmit the voice spread signal generated by the spreader.

2. The apparatus of claim 1, wherein the transmitter transmits the voice spread signal asynchronously.

3. An apparatus for wireless communication, the apparatus comprising:
   a spreader, having an input and an output, the spreader operable to receive a digitized voice signal at the input and to spread the digitized voice signal using a voice spreading sequence length less than an available spreading gain for a given transmission bandwidth to generate a voice spread signal; and
   a transmitter operable to transmit the voice spread signal generated by the spreader, said transmitter waiting a random amount of time before retransmitting the voice spread signal upon receipt of an acknowledgment of an unsuccessful transmission received from a base station.

4. The apparatus of claim 3, wherein the transmitter transmits the voice spread signal asynchronously.

5. An apparatus for wireless communication, the apparatus comprising:
   a spreader, having an input and an output, the spreader operable to receive a digitized voice signal at the input and to spread the digitized voice signal using a voice spreading sequence length less than an available spreading gain for a given transmission bandwidth to generate a voice spread signal;
   a conditioner coupled to the input of the spreader, the conditioner operable to specify a portion of a digital signal representative of digitized voice signals for spreading by the spreader;
   a buffer coupled between the conditioner and the input of the spreader, the buffer operable to receive the portion of the digital signal from the conditioner and to store the portion of the digital signal for use by the spreader; and
   a transmitter operable to transmit the voice spread signal generated by the spreader.

6. The apparatus of claim 5, wherein the transmitter transmits the voice spread signal asynchronously.

7. An apparatus for wireless communication, the apparatus comprising:
   a spreader, having an input and an output, the spreader operable to receive a digitized voice signal at the input and to spread the digitized voice signal using a voice spreading sequence length less than an available spreading gain for a given transmission bandwidth to generate a voice spread signal;
   a conditioner coupled to the input of the spreader, the conditioner operable to specify a portion of a digital signal representative of digitized voice signals for spreading by the spreader, wherein the conditioner is further operable to append to the portion of the digital signal at least one of a plurality of synchronization bits, identification bits, and channel coding bits; and
   a transmitter operable to transmit the voice spread signal generated by the spreader.

8. The apparatus of claim 7, wherein the transmitter transmits the voice spread signal asynchronously.

9. An apparatus for wireless communication, the apparatus comprising:
   a spreader, having an input and an output, the spreader operable to receive a digitized voice signal at the input and to spread the digitized voice signal using a voice spreading sequence length less than an available spreading gain for a given transmission bandwidth to generate a voice spread signal; and
   a transmitter operable to transmit the voice spread signal generated by the spreader in a transmission time small enough to allow for retransmission within a packet buffering interval.

10. The apparatus of claim 9, wherein the transmitter transmits the voice spread signal asynchronously.

11. A method for wireless communication, comprising:
    receiving a packetized voice signal at a spreader;
    spreading the packetized voice signal using a voice spreading sequence length less than an available spreading gain for a given transmission bandwidth;
    transmitting the voice spread signal;
    receiving a data signal at a spreader;
    spreading the data signal using a data spreading sequence length greater than the voice spreading sequence length to generate a data spread signal; and
    transmitting the data spread signal.

12. The method of claim 11, wherein the step of transmitting is performed asynchronously.

13. A method for wireless communication, comprising:
    receiving a packetized voice signal at a spreader;
    spreading the packetized voice signal using a voice spreading sequence length less than an available spreading gain for a given transmission bandwidth;
    transmitting the voice spread signal; and
    waiting a random amount of time before retransmitting the voice spread signal upon receiving an acknowledgment of an unsuccessful transmission.

14. A method for wireless communication, comprising:
    receiving a packetized voice signal at a spreader;
    spreading the packetized voice signal using a voice spreading sequence length less than an available spreading gain for a given transmission bandwidth;
    transmitting the voice spread signal, said step of transmitting comprising transmitting within a transmission time that allows for retransmission within a given packet buffering interval.

15. A system for wireless communications, comprising:
    a first transceiver operable to generate a first voice spread signal using a first voice spreading sequence length less than an available spreading gain, the transceiver further operable to asynchronously transmit the first voice spread signal;

a second transceiver operable to generate a second voice spread signal using a second voice spreading sequence length less than an available spreading gain, the transceiver further operable to asynchronously transmit the second voice spread signal; and a base station operable to receive the first voice spread signal and the second voice spread signal.

16. A system for wireless communications, comprising:

a first transceiver operable to generate a first voice spread signal using a first voice spreading sequence length less than an available spreading gain, the transceiver further operable to transmit the first voice spread signal;

a second transceiver operable to generate a second voice spread signal using a second voice spreading sequence length the same as the length of the first voice spreading sequence and less than an available spreading gain, the transceiver further operable to transmit the second voice spread signal; and a base station operable to receive the first voice spread signal and the second voice spread signal.

17. The system of claim 16, wherein the first transceiver transmits the first voice spread signal asynchronously.

18. The system of claim 16, wherein the second transceiver transmits the second voice spread signal asynchronously.

19. A system for wireless communications, comprising:

a first transceiver operable to generate a first voice spread signal using a first voice spreading sequence length less than an available spreading gain, the transceiver further operable to transmit the first voice spread signal within a transmission time small enough to allow for retransmission in a packet buffering interval;

a second transceiver operable to generate a second voice spread signal using a second voice spreading sequence length less than an available spreading gain, the transceiver further operable to transmit the second voice spread signal; and a base station operable to receive the first voice spread signal and the second voice spread signal.

20. The system of claim 17, wherein the first transceiver transmits the first voice spread signal asynchronously.

21. The system of claim 17, wherein the second transceiver transmits the second voice spread signal asynchronously.

22. A system for wireless communications, comprising:

a first transceiver operable to generate a first voice spread signal using a first voice spreading sequence length less than an available spreading gain, the transceiver further operable to transmit the first voice spread signal and wherein the first transceiver is further operable to generate a first data spread signal using a first data spreading sequence length greater than the first voice spreading sequence length;

a second transceiver operable to generate a second voice spread signal using a second voice spreading sequence length less than an available spreading gain, the transceiver further operable to transmit the second voice spread signal; and a base station operable to receive the first voice spread signal and the second voice spread signal.

23. The system of claim 22, wherein the first transceiver transmits the first voice spread signal asynchronously.

24. The system of claim 22, wherein the second transceiver transmits the second voice spread signal asynchronously.

* * * * *